(12) United States Patent
Schoeck et al.

(10) Patent No.: US 11,284,181 B2
(45) Date of Patent: Mar. 22, 2022

(54) AUDIO DEVICE CHARGING CASE WITH DATA CONNECTIVITY

(71) Applicant: Microsoft Technology Licensing, LLC, Redmond, WA (US)

(72) Inventors: Kaitlyn Marley Schoeck, Seattle, WA (US); Ralf Groene, Kirkland, WA (US); Panos Costa Panay, Redmond, WA (US); Young Soo Kim, Bellevue, WA (US); Woo Ram Lee, Kirkland, WA (US); Juha Eero Olavi Kuosmanen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/228,189

(22) Filed: Dec. 20, 2018

(65) Prior Publication Data

US 2020/0204898 A1    Jun. 25, 2020

(51) Int. Cl.
*H04R 1/10*    (2006.01)
*G06F 3/16*    (2006.01)
*H04M 1/60*    (2006.01)

(52) U.S. Cl.
CPC .......... *H04R 1/1025* (2013.01); *G06F 3/167* (2013.01); *H04M 1/6066* (2013.01); *H04R 1/1016* (2013.01); *H04R 1/1041* (2013.01); *H04R 2420/07* (2013.01)

(58) Field of Classification Search
CPC .. H04R 1/1041; H04R 1/1016; H04R 1/1025; H04R 2420/07; H04R 1/10; H04R 1/1008; H04R 1/222; H04R 2420/09; H04R 2430/01; H04R 25/405; H04R 3/005; H04B 2001/3861; H04B 2001/3866; H04B 7/18506; G10K 11/175; G10K 11/1785; G10K 2210/12; H04Q 2213/13242; H04Q 2213/13248
USPC ................ 381/74, 323, 314, 322, 309, 312
See application file for complete search history.

(56) References Cited

U.S. PATENT DOCUMENTS

| 6,542,757 B2 | 4/2003 | Bae |
| 8,260,999 B2 | 9/2012 | Ganesh et al. |
| 8,489,151 B2 | 7/2013 | Van Engelen et al. |
| 9,301,085 B2 | 3/2016 | Parkinson et al. |

(Continued)

OTHER PUBLICATIONS

"Mi Bluetooth Headset Basic with Dock", Retrieved From: https://web.archive.Org/web/20180312040631/https://www.mi.com/US/mi-bluetooth-headset-basic-with-dock/, Mar. 12, 2018, 7 Pages.

(Continued)

*Primary Examiner* — Lun-See Lao
(74) *Attorney, Agent, or Firm* — Ray Quinney & Nebeker P.C.; Paul N. Taylor

(57) ABSTRACT

An electronic device for charging earphones includes a housing, a processor, a power supply, a wireless communication device, and a hardware storage device in data communication with the processor. The housing is configured to couple with the earphones. The power supply is in electrical communication with the processor and with an electrical contact to provide electrical communication with earphones. The wireless communication device is in data communication with the processor and configured to be in wireless data communication with the earphones. The hardware storage device is in data communication with the processor.

20 Claims, 6 Drawing Sheets

(56) References Cited

U.S. PATENT DOCUMENTS

| | | |
|---|---|---|
| 9,807,491 B2 | 10/2017 | Kim |
| 10,085,083 B2 | 9/2018 | Minoo et al. |
| 10,129,626 B1* | 11/2018 | Jung .................. H02J 7/342 |
| 10,182,282 B2* | 1/2019 | McPeak ................ H02J 7/025 |
| 10,735,845 B2* | 8/2020 | Lee ...................... H04R 1/1025 |
| 2008/0300025 A1* | 12/2008 | Song .................. H04M 1/6066 |
| | | 455/569.1 |
| 2009/0197649 A1 | 8/2009 | Ranney |
| 2009/0240497 A1* | 9/2009 | Usher ...................... H04R 1/10 |
| | | 704/235 |
| 2010/0062731 A1* | 3/2010 | Ham ...................... G06F 1/1632 |
| | | 455/90.3 |
| 2010/0137038 A1* | 6/2010 | Scholz ................. H04R 1/1025 |
| | | 455/573 |
| 2010/0271983 A1* | 10/2010 | Bryant .................. H04B 1/385 |
| | | 370/277 |
| 2013/0148839 A1* | 6/2013 | Stevinson ............ H04R 1/1033 |
| | | 381/384 |
| 2013/0238829 A1* | 9/2013 | Laycock ............... H04R 1/1033 |
| | | 710/303 |
| 2014/0273851 A1* | 9/2014 | Donaldson ............... H04M 1/05 |
| | | 455/41.2 |
| 2015/0373448 A1* | 12/2015 | Shaffer ................ H04R 1/1025 |
| | | 381/74 |
| 2017/0094394 A1 | 3/2017 | Mcpeak et al. |
| 2017/0164089 A1* | 6/2017 | Lee ...................... H04R 1/1025 |
| 2017/0195466 A1* | 7/2017 | Chen ................. H04M 1/72527 |
| 2018/0124491 A1* | 5/2018 | Dragicevic ............... H04R 1/08 |
| 2018/0367883 A1* | 12/2018 | Minoo ................. H05K 999/99 |
| 2019/0166435 A1* | 5/2019 | Crow .................... H04R 25/505 |

OTHER PUBLICATIONS

"International Search Report and Written Opinion Issued in PCT Application No. PCT/US19/065831", dated Feb. 28, 2020, 11 Pages.

\* cited by examiner

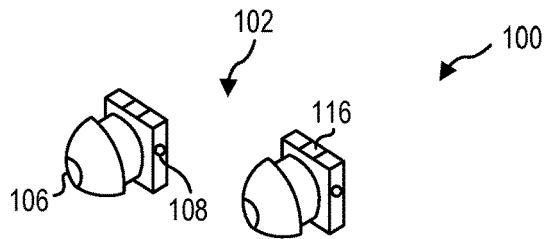
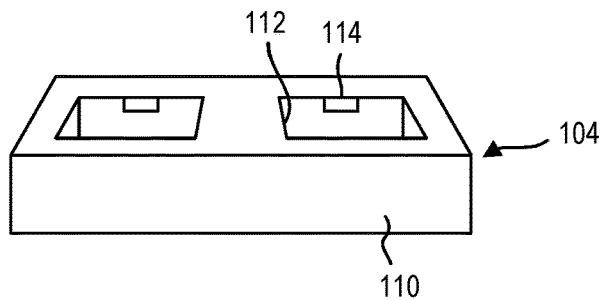
FIG. 1-1
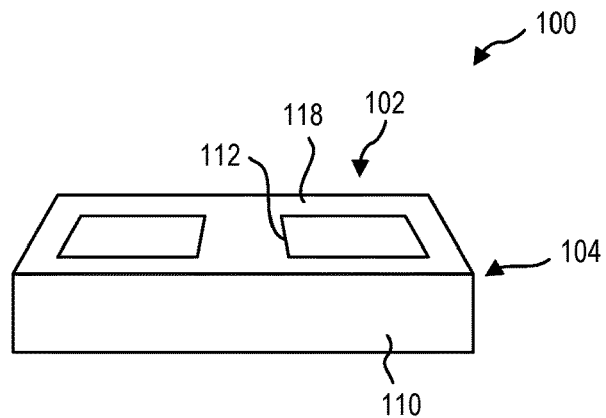
FIG. 1-2
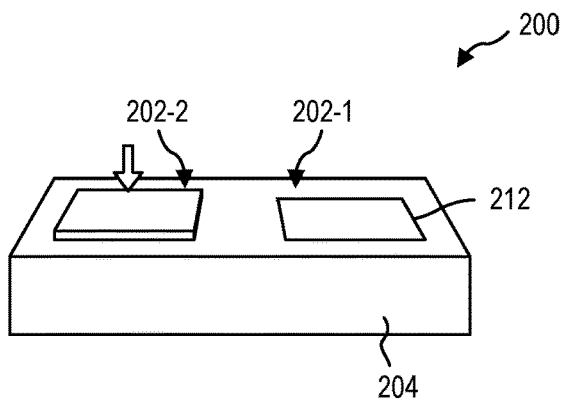
FIG. 2

AUDIO DEVICE CHARGING CASE WITH DATA CONNECTIVITY

CROSS-REFERENCE TO RELATED APPLICATIONS

N/A

BACKGROUND OF THE DISCLOSURE

Portable electronic devices are commonly used in public spaces and carried with a person throughout a day. The ability to engage with the audio of a personal device privately for the entire day is important. Providing additional charge to private audio earphones allows a user to continue using small, convenient devices throughout the day without introducing large batteries to the earphones.

However, maintaining the small form factor of convenient earphones requires pairing the earphones to yet another electronic device, increasing the number of electronic devices. Further, a user may desire to use the earphones with a variety of devices and to provide audio commands to a variety of devices, complicating the user's experience and limiting the convenience of the earphones.

SUMMARY

In some embodiments, an electronic device for charging earphones includes a housing, a processor, a power supply, a wireless communication device, and a hardware storage device in data communication with the processor. The housing is configured to couple with the earphones. The power supply is in electrical communication with the processor and with an electrical contact to provide electrical communication with earphones. The wireless communication device is in data communication with the processor and configured to be in wireless data communication with the earphones. The hardware storage device is in data communication with the processor.

In some embodiments, an electronic communication system includes an earphone and an electronic device for charging the earphone. The earphone includes a microphone, a first wireless communication device, and a speaker. The electronic device for charging the earphone includes a housing, a processor, a battery, a second wireless communication device, and a hardware storage device. The housing has a port into which the earphone may dock. The battery is in electrical communication with the processor and with an electrical contact to provide electrical communication with earphones when docked. The second wireless communication device is in data communication with the processor and configured to be in wireless data communication with the earphones. The hardware storage device is in data communication with the processor.

In some embodiments, an electronic device for charging earphones includes a housing, a processor, a battery, a first wireless communication device, a second wireless communication device, and a hardware storage device in data communication with the processor. The housing is configured to couple with the earphones. The battery is in electrical communication with the processor and with an electrical contact to provide electrical communication with earphones. The first wireless communication device is in data communication with the processor and configured to be in wireless data communication with the earphones. The second wireless communication device is in data communication with the processor and configured to provide data communication between the electronic device and a data network. The hardware storage device is in data communication with the processor.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1-1 is a perspective view of a system including earphones and a charging case, according to at least one embodiment of the current disclosure;

FIG. 1-2 is a perspective view of the system of FIG. 1-1 with the earphones docked in the charging case;

FIG. 2 is a perspective view of another system including earphones and a charging case, according to at least one embodiment of the current disclosure;

FIG. 7-1 is a top perspective view of another system including earphones and a charging case with microphones and speakers available while docked, according to at least one embodiment of the current disclosure;

FIG. 7-2 is a bottom perspective view of the system of FIG. 7-1;

DETAILED DESCRIPTION

This disclosure generally relates to devices, systems, and methods for providing audio communications in a portable device. More specifically, the present disclosure relates the use of earphones with a supplemental charging case having data connectivity. The charging case provides a data connection through wired or wireless communication with another electronic device or data network. The data connection allows the earphones to provide audio notifications or communications without another computing device. In some embodiments, the charging case has a data connection to the earphones to provide information. In other embodiments, a microphone and/or speaker of the earphones is usable while the earphones are docked to the charging case.

Figures 1, 7:
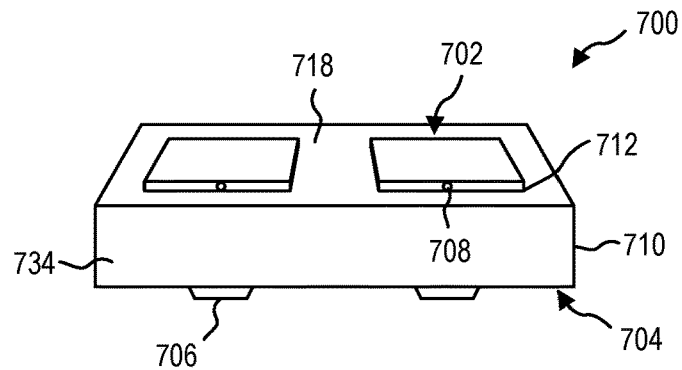
Figures 2, 7:
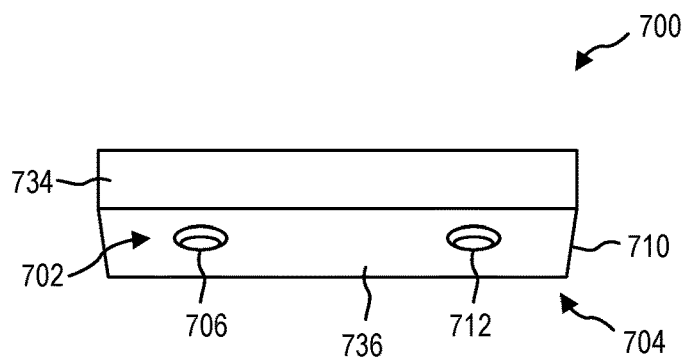

FIGS. 1-1 and 1-2 are perspective views of an embodiment of a system 100 including earphones 102 and a charging case 104. The earphones 102 contain a speaker 106 and a microphone 108 that allows a user to receive and send audio information through the earphones 102. The charging case 104 has a housing 110 with one or more ports 112 in an outer surface of the housing 110. The ports 112 are sized and shaped to receive the earphones 102 into the housing 110.

The housing 110 may include a case electrical contact 114. The case electrical contact 114 may contact and provide an electrical communication with an earphone electrical contact 116 positioned on the earphone 102. The electrical communication through the case electrical contact 114 and the earphone electrical contact 116 may allow the case 104 to provide electrical power to the earphones 102. In some embodiments, the case 104 may include a power supply to power the earphones 102 while the earphones 102 are docked in the ports 112 of the case 104. In other embodiments, the case 104 includes a power supply to charge a battery of the earphones 102, such that the earphones 102 can operate when not docked in the ports 112 of the case 104. In some embodiments, the power supply is a battery. In other embodiments, the power supply is a wired power supply that may draw electricity from another source, such as an electrical outlet.

In the embodiment illustrated in FIG. 1-1, the case electrical contact 114 and the earphone electrical contact 116 are positioned at discrete locations on the edge of the port 112 and/or the earphone 102, respectively. The case 104 may couple (e.g., dock) with the earphone 102. In other words, the case 104 may physically receive at least a portion of the earphone 102. In such embodiments, the earphones 102 and the ports 112 can have complementary keying features to promote the alignment of the case electrical contact 114 and the earphone electrical contact 116. In some examples, the complimentary keying features may be complimentary magnets, interlocking notches, protrusions, recesses, splines, or other features that allow the insertion and removal of the earphones 102 from the case 104, while rotationally fixing the earphone 102 and port 112 of the case 104 relative to one another. In other examples, the keying features may be a non-circular earphone 102 and port 112 that only allows docking of the earphone 102 in the port 112 in one orientation or at a set of discrete orientations, such as 180° rotations of an oval earphone 102 and complementary oval port 112. The various computing components (e.g., processor, power supply, wireless communication device, and hardware storage device) may be at least partially stored within the housing 110.

FIG. 1-2 illustrates an embodiment of the system 100 described in relation to FIG. 1-1 with the earphones 102 docked in the case 104. In some embodiments, the earphones 102 may dock in the port 112 with a surface of the earphone 102 flush with a top surface of the housing 110 of the case 104. In other embodiments, the earphones 102 may dock in the port 112 with at least a portion of the surface of the earphone 102 recessed in the port 112 below a top surface 118 of the housing 110. In yet other embodiments, the earphones 102 may dock in the port 112 with at least a portion of a surface of the earphone 102 proud from or above the top surface 118 of the housing 110.

FIG. 2 is a perspective view of an embodiment of a system 200 including a plurality of earphones 202-1, 202-2 and a case 204. A first earphone 202-1 is docked in the case 204. A second earphone 202-2 is being inserted in the port 212 to dock the second earphone 202-2. In some embodiments, the earphones 202-1, 202-2 are retained in the case 204 while docked by a friction fit. For example, removal of the earphones 202-1, 202-2 from a friction fit may include prying the earphones 202-1, 202-2 from the case 204. In other embodiments, the earphones 202-1, 202-2 are retained in the case 204 while docked by a clasp mechanism. For example, removal of the earphones 202-1, 202-2 may include using a push-push or click mechanism. A push-push mechanism engages the clasp when the earphones 202-1, 202-2 are pushed into the port 212. The push-push mechanism then disengages the clasp upon a second push on the earphones 202-1, 202-2 when the earphones 202-1, 202-2 are already docked.

Figure 3:
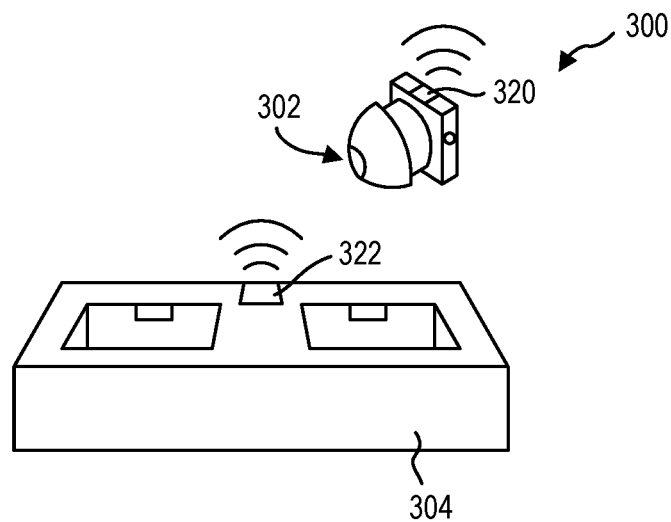
FIG. 3 is a perspective view of a system with data communication between earphones and a charging case, according to at least one embodiment of the current disclosure.

In some embodiments, a system 300 includes data communication between the earphones 302 and the case 304, as shown in FIG. 3. The earphone 302 and the case 304 may be in Bluetooth communication. In other examples, the earphone 302 and the case 304 may be in other wireless communication. The earphone 302 may have an earphone wireless communication device 320 and the case 304 may have a case wireless communication device 322. The earphone wireless communication device 320 and the case wireless communication device 322 may allow data communication and/or audio communication between the earphone 302 and the case 304. For example, the case 304 may include a processor, memory, or other electronic components that allow the case 304 to communication information or instructions to the earphone 302 to play audio to a user.

Figure 4:
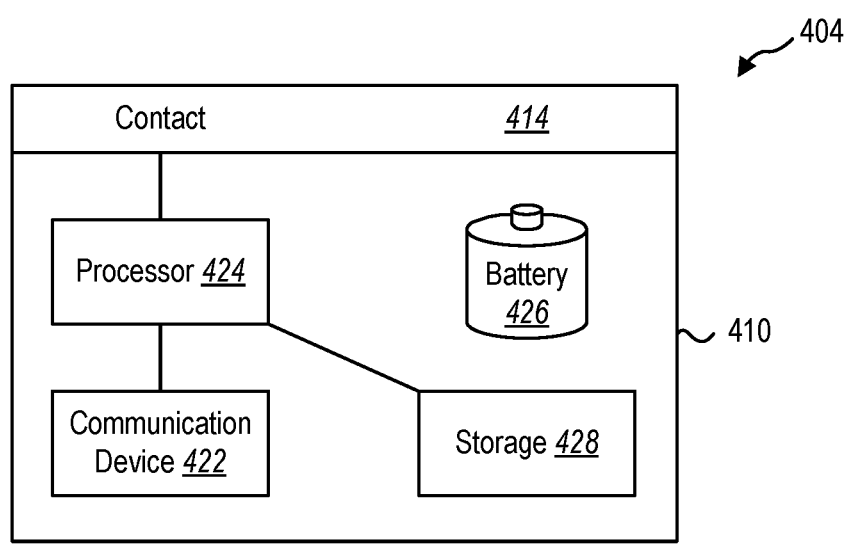
FIG. 4 is a schematic system diagram of a charging case, according to at least one embodiment of the current disclosure.

FIG. 4 is a schematic system diagram of a case 404, according to the present disclosure. The case 404 has a housing 410 that contains or supports a plurality of electronic components including a processor 424, a power supply such as a battery 426, and a hardware storage device 428. As described in relation to FIG. 3, the case 404 may contain or support a case communication device 422. The processor 424 is in data communication with the case communication device 422 and the hardware storage device 428. The power supply provides electrical power to the electronic components and, particularly, to the electrical contact 414 of the case 404 to charge associated earphones (such as the earphone 302 described in relation to FIG. 3).

The hardware storage device 428 may be any platen-based storage device, solid-state storage device, or other non-transitory or long-term storage device. The hardware storage device 428 may have instructions stored thereon that, when executed by the processor 424 cause the processor 424 to perform any of the methods or techniques described herein.

Figure 5:
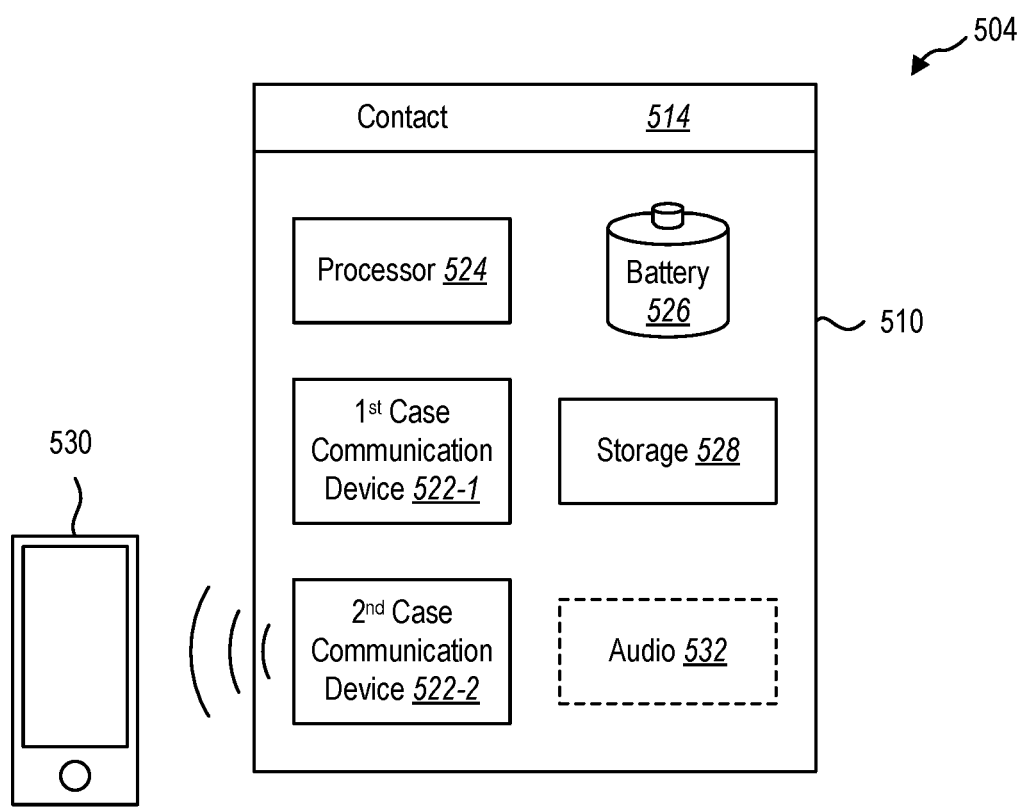
FIG. 5 is a schematic system diagram of another charging case, according to at least one embodiment of the current disclosure.

FIG. 5 is a schematic system diagram of another embodiment of a case 504 that may be used in conjunction with earphones (such as earphone 302 described in relation to FIG. 3). The case 504 includes a housing 510 that contains or supports a plurality of electrical components including a processor 524, a power supply such as a battery 526, a first case communication device 522-1, and a hardware storage device 528.

In some embodiments, the case 504 includes a second case communication device 522-2. For example, the first case communication device 522-1 may pair with or otherwise provide communication with the earphones, as described in relation to FIG. 3. The second case communication device 522-2 may pair with or otherwise provide data communication to an external electronic device 530 or a data network such as the internet, a private network, a cellular network (e.g., an LTE network), or other data network. For example, the second case communication device 522-2 may provide a cellular connection, a Wi-Fi connection, a Bluetooth connection, or a wired data connection.

In some embodiments, the external electronic device 530 may additionally be connected to the internet or another data network and relay information from the data network through the external electronic device 530 to the case 504. In some examples, the external electronic device 530 may be a smartphone; a tablet personal computer (PC); a laptop PC; a desktop PC; a network server; a network router; a wearable electronic device, such as a smartwatch, head-mounted device, wrist-mounted device, or other wearable device; or other electronic devices containing at least one communication device through which the case 504 may communicate.

In some embodiments, the case 504 may optionally have one or more audio components 532 to supplement the audio components of the earphones. For example, the case 504 may relay information to the earphones through the first case communication device 522-1 while the earphones are worn by a user. However, when the earphones are docked with the case 504 and being charged via the electrical contact 514 in the housing 510, the user may be unable to receive audio information from or provide audio information to the earphones.

One or more audio components 532 in the case 504 allows the case 504 provide or receive audio information without relaying the information through the earphones. For example, the audio component 532 in the case 504 may include a microphone, a speaker, or both. The user may have the option, therefore, of receiving audio information from a speaker in the case 504 when the user receives a text message (e.g., MMS message, SMS message, or other text-based messaging service), voice call (e.g., a cellular voice call or a voice over IP or "VOIP" call), email, or other communication from the external computing device 530 or data network. However, in some cases, the user may desire to receive the audio information privately. The user may undock the earphones from the case 504 and use the speakers of the earphones to listen to the audio information without concern for other individuals listening. In such examples, the case 504 may include a microphone, but no speakers.

Figure 6:
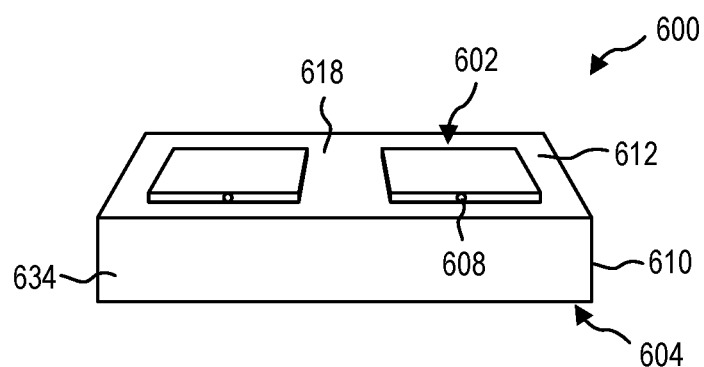
FIG. 6 is a perspective view of a system including earphones and a charging case with microphones available while docked, according to at least one embodiment of the current disclosure.

In yet other embodiments, a system 600 leverages the audio components of the earphones 602 when the earphones 602 are docked, as shown in FIG. 6. This may save space, cost, and system resources of the case 604. For example, the earphones 602 may dock in ports 612 of the case 604 with a microphone 608 of the earphones 602 positioned above a top surface 618 of the housing 610. In other examples, the microphone 608 may be positioned on a surface of the earphone 602 that is flush with a top surface 618 of the housing 610. In yet other examples the microphone 608 is positioned near or flush with a sidewall 634 of the housing 610, such that the microphone can receive sounds through a sidewall of the housing 610 while the earphone 602 is flush with a top surface 618 of the housing 610.

In such embodiments, the data connection between the earphones 602 and the case 604 allows the microphone 608 to transmit audio information or audio commands to the case 604. In some embodiments, the case 604 may then transmit the audio information or audio commands to an external computing device or data network.

FIGS. 7-1 and 7-2 are perspective views of yet another embodiment of a system 700 according to the present disclosure. The system includes earphones 702 and a case 704. The housing 710 of the case 704 is sized and shaped to allow a user to access and use the speaker 706 of the earphones 702 while the earphones 702 are docked in ports 712 of the case 704. In some embodiments, both the speakers 706 and the microphone 708 are accessible. For example, the earphones 702 may dock in ports 712 of the case 704 with a microphone 708 of the earphones 702 positioned above a top surface 718 of the housing 710. In other examples, the microphone 708 may be positioned on a surface of the earphone 702 that is flush with a top surface 718 of the housing 710. In yet other examples, the microphone 708 is positioned near or flush with a sidewall 734 of the housing 710, such that the microphone 708 can receive sounds through a sidewall 734 of the housing 710 while the earphone 702 is flush with a top surface 718 of the housing 710.

FIG. 7-2 is a bottom view of the system 700 of FIG. 7-1. In some embodiments, the earphones 702 may dock in ports 712 of the case 704 with a speaker 706 of the earphones 702 positioned proud of or beyond a bottom surface 736 of the housing 710. In other examples, the speaker 706 may be positioned on a surface of the earphone 702 that is flush with a bottom surface 736 of the housing 710. In yet other examples, the speaker 706 is positioned near or flush with a sidewall 734 of the housing 710, such that the speaker 706 can play sounds through a sidewall 734 of the housing 710 while the earphone 702 is flush with a top surface or bottom surface 736 of the housing 710.

In some embodiments, the speaker 706 and microphone 708 of the earphone 702 are positioned on opposite sides of the case 704 when docked in the case 704, such as shown in FIG. 7-1 and FIG. 7-2. In other embodiments, the earphones 702 may be configured such that the speaker 706 and the microphone 708 are positioned on the same side of the case 704. For example, both the speaker 706 and the microphone 708 may be positioned proximate the top surface 718. In yet other embodiments, one of a speaker 706 and a microphone 708 is positioned proximate a sidewall 734 of the housing 710, and the other of the speaker 706 and the microphone 708 is positioned proximate the top surface 718 or bottom surface 736. In further embodiments, both a speaker 706 and the microphone 708 are positioned proximate a sidewall 734 of the housing 710. In yet further embodiments, the earphones 702 may be docked in ports 712 of the case 704 with opposite orientations, such that one earphone 702 has a speaker 706 proximate the top surface 718 and the other earphone 702 has a microphone 708 proximate the top surface 718.

Figure 8:
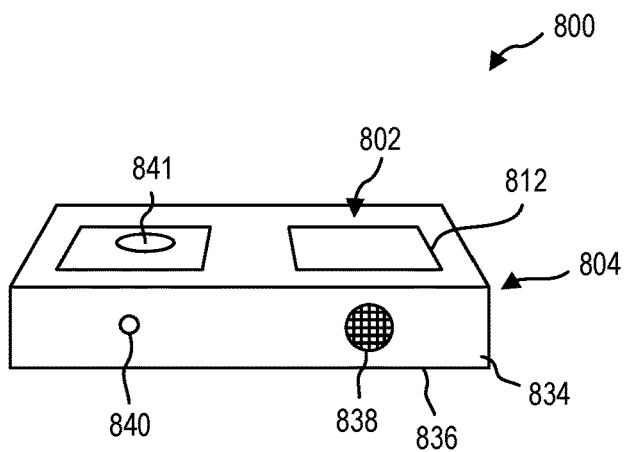
FIG. 8 is a perspective view of another system including earphones and a charging case with a microphone and speaker in the charging case, according to at least one embodiment of the current disclosure.

Still other embodiments of a system 800 have a case speaker 838 and/or a case microphone 840 positioned in the case 804 (such as described in relation to FIG. 5), such as shown in FIG. 8. The case speaker 838 and/or case microphone 840 can be positioned on a top surface 818, sidewall 834, or bottom surface 836 of the case 804. The case 804 may use the case speaker 838 and/or a case microphone 840 to play and/or receive audio information when the earphones 802 are docked in the case 804. In other instances, the case 804 may use the case speaker 838 and/or a case microphone 840 to play and/or receive audio information when there is no data communication between the earphones 802 and the case 804.

For example, if the batteries in the earphones 802 deplete, the case speaker 838 and/or a case microphone 840 may be used as backup audio components. In another examples, the user may move the earphones 802 and case 804 away from one another beyond the range of the earphone communication device and the case communication device (e.g., earphone wireless communication device 320 and the case wireless communication device 322 described in relation to FIG. 3), terminating data communication between the earphones 802 and the case 804. In yet another example, the user may pair the earphones 802 to a different device, terminating data communication between the earphones 802 and the case 804.

In some embodiments, an earphone 802 has a button, switch, touch-sensing surface, or other input device 841 positioned on a surface of the earphone. The input device 841 may be exposed while the earphone 802 is docked in the case 804, allowing the user to provide physical commands to the system 800 by touching, moving, or clicking the input device 841.

Figure 9:
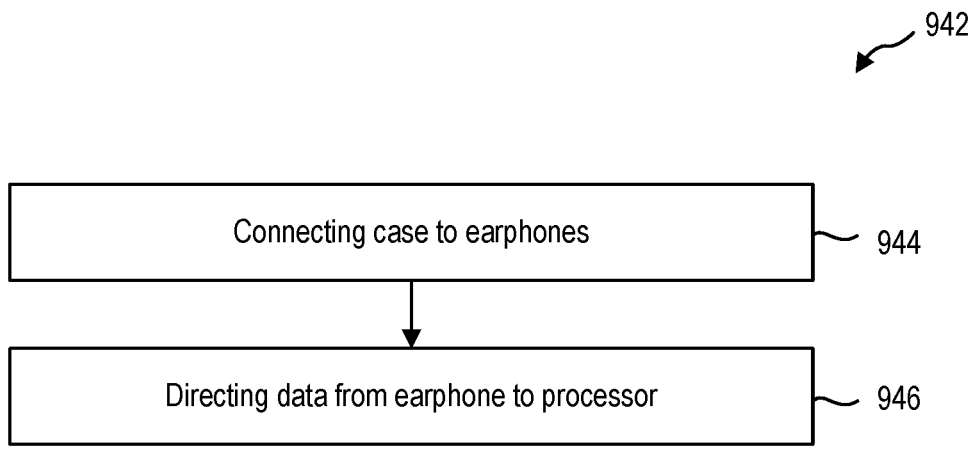
FIG. 9 is flowchart illustrating a method of communication between an earphone and a charging case, according to at least one embodiment of the current disclosure.

FIG. 9 is a flowchart illustrating a method 942 of transmitting data between the earphones and a charging case of a system. The method 942 includes connecting a charging case to earphones via a data connection at 944. The data connection may be a wired or wireless data connection. In at least one example, the data connection is a Bluetooth connection. In at least another example, the data connection is a physical contact between electrical contacts of the charging case and the earphones.

The method further includes directing data from the earphone to a processor of the charging case via the data connection at 946. For example, a user may speak into a microphone of the earphone and the earphone may transmit that audio information from the earphone to the charging case via the data connection. A case communication device can then transmit the data to the processor located in the charging case. In some embodiments, the processor stores the audio information in a hardware storage device. In other embodiments, the processor further transmits the audio information to an external computing device. In yet other embodiments, the processor evaluates the audio information to search for any recognized audio commands that may instruct the processor to execute additional tasks.

Figure 10:
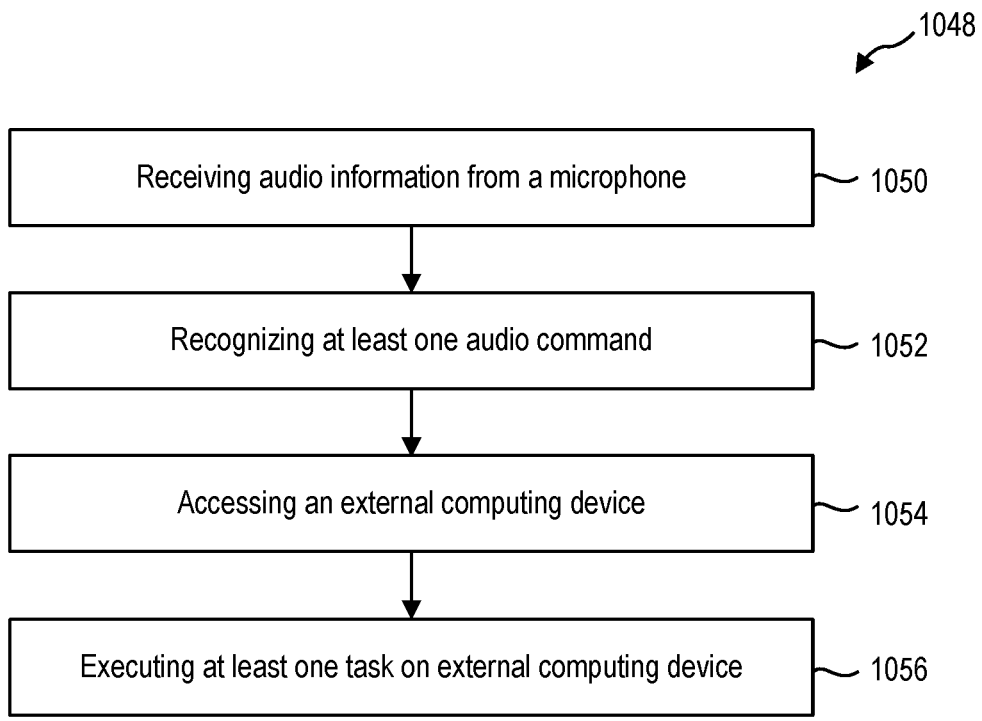
FIG. 10 is a flowchart illustrating a method of executing a task with an audio command, according to at least one embodiment of the current disclosure.

For example, FIG. 10 is a flowchart illustrating a method 1048 of performing a task on a computer via a charging case. The method 1048 includes receiving audio information from a microphone in data communication with an earphone charging case at 1050. In some embodiments, the microphone is integrated into the charging case, such as described in relation to FIG. 8. In other embodiments, the microphone is part of an earphone that is docked in the charging case, such as described in relation to FIG. 6 through FIG. 7-2. In yet other embodiments, the microphone is part of an earphone that is in data connection with the charging case, such as described in relation to FIG. 3.

The audio information is transmitted from the microphone to a processor of the charging case. The method 1048 further includes recognizing at least one audio command in the audio information at 1052. For example, the audio information may contain an initialization command that the processor recognizes. The initialization command can then be followed by an additional audio command to instruct the processor to perform a task. An example initialization command may be "Hey [device]," which prompts the processor to accept the next piece of audio information as an audio command, and the audio command may be "send a text message." Such an audio command may allow dictation of a text message. Other example audio commands include instructing the processor to place a voice call, send an email, read an email, read a text message, record a voice memo, or create a calendar event.

After recognizing at least one audio command, the method further includes accessing an external computing device 1054 and executing at least one task on the external computing device at 1056. In some embodiments, accessing the external computing device and executing a task on the external computing device include communicating with a paired smartphone, where the smartphone performs the task (such as sending a text message, email, or voice call). In other embodiments, accessing the external computing device and executing a task on the external computing device includes communicating with a data network and, through the data network, sending instructions to execute a task associated with the audio command on an external computing device.

Figure 11:
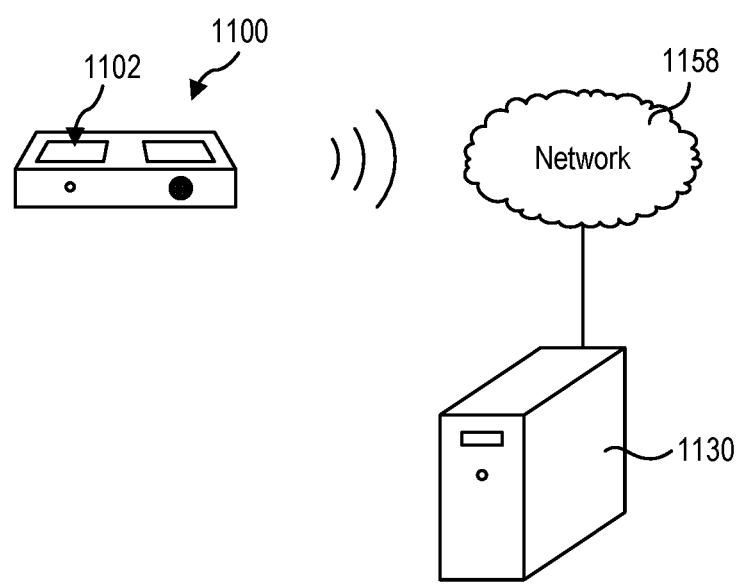
FIG. 11 is a system diagram illustrating a charging case communicating with an external computing device via a data network, according to at least one embodiment of the current disclosure.

FIG. 11 is a schematic diagram of a charging case 1104 communicating over a data network. While the system 1100 including the charging case 1104 and earphones 1102 is illustrated similarly to the system 800 described in relation to FIG. 8, it should be understood that any of the systems or charging cases described herein may communicate with a data network in the depicted manner. The charging case 1104 is in data communication with a data network 1158. The data network 1158 is then in data communication with an external computing device 1130. The charging case 1104 may provide instructions through the data network 1158 to the external computing device 1130.

In some embodiments, the charging case 1104 may translate audio commands from a user to instructions that are recognized by the external computing device 1130. For example, the charging case 1104 may receive an audio command to send an email. The same audio command may not be recognized by the external computing device 1130. The charging case 1104 may process the audio command and transmit instructions in a format recognized by the external computing device 1130. This may allow the user to provide audio commands to external computing devices 1130 that would not otherwise be controllable by audio commands provided directly (or through the earphones 1102) to the external computing device 1130. In at least one example, a cloud-based computer may be unable to recognize an audio command of "Hey [device], send an email," while the charging case 1104 may interpret that audio command for the cloud-based computer and send instructions to the cloud-based computer.

In another example, the data network 1158 may provide data communication to a plurality of external computing devices with different functionality. The charging case 1104 may recognize a known set of audio commands, simplifying the experience for a user, and may direct instructions to a variety of external computing devices based on the nature of the instructions. In a particular example, a charging case 1104 may be in data communication with a smartphone. A first audio command may instruct the smartphone to place a voice call. A second audio command may instruct a cloud-based computer to create a calendar event on a calendar stored on the cloud-based storage. In both cases, the user only need to interact with the system 1100 of the earphones 1102 and/or the charging case 1104.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual embodiment, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An electronic dock for charging earphones, the electronic dock comprising:
   a dock housing, the dock housing including one or more ports configured to receive the earphones;
   a power supply at least partially contained within the dock housing and electrically coupled with the earphones, the power supply configured to provide power to the earphones;
   a communication device at least partially contained within the dock housing and in data communication with the earphones;
   a hardware storage device at least partially contained within the dock housing;
   an audio interface component configured to facilitate use of and access to a speaker of the earphones while the earphones are docked in the dock housing; and
   a processor at least partially contained within the dock housing, the processor configured to:
     relay audio data between the earphones and the audio interface component in conjunction with the communication device.

2. The electronic dock of claim 1, the hardware storage device having instructions stored thereon that, when executed by the processor, cause the processor to:
   connect the communication device to the earphones; and
   direct data from the earphones to the processor.

3. The electronic dock of claim 1, wherein the audio data comprises audio communications for a voice call between the user and a remote user, whereby the user may utilize the earphones for the voice call without removing the earphones from the electronic dock.

4. The electronic dock of claim 1, wherein the audio interface component includes at least one microphone; and wherein the processor is configured to transfer audio data captured by the at least one microphone to the earphones.

5. The electronic dock of claim 4, wherein the processor is configured to utilize one or more speakers of the earphones to output audio to the user.

6. The electronic dock of claim 1, wherein the audio interface component includes at least one speaker; and wherein the processor is configured to transfer audio data from the earphones to the at least one speaker for output to the user.

7. The electronic dock of claim 1, wherein the one or more ports comprise one or more apertures in the dock housing, the apertures positioned to align with one or more speakers of the earphones such that the dock housing does not occlude the speakers of the earphones.

8. The electronic dock of claim 1, wherein the one or more ports comprise one or more keying features.

9. An electronic communication system, the electronic communication system comprising:
- an earphone, the earphone including:
  - a microphone,
  - a first wireless communication device, and
  - a speaker; and
- an electronic dock for charging the earphone, the electronic dock including:
  - a housing, the housing having a port into which the earphone may dock, wherein the speaker of the earphone is accessible from the housing when the earphone is docked in the port to allow access to and use of the speaker of the earphone when the earphone is docked in the port,
  - a processor at least partially contained within the housing,
  - a battery at least partially contained within the housing and in electrical communication with the processor and with an electrical contact to provide electrical communication with the earphone,
  - a second wireless communication device at least partially contained within the housing and in data communication with the processor and configured to be in wireless data communication with the earphones, and
  - a hardware storage device at least partially contained within the housing and in data communication with the processor.

10. The electronic communication system of claim 9, the electronic dock further comprising a data communication device configured to provide data communication between the processor and a data network.

11. The electronic communication system of claim 10, the data communication device providing a cellular data connection.

12. The electronic communication system of claim 10, the data communication device providing a WiFi data connection.

13. The electronic communication system of claim 10, the data communication device providing a wired data connection.

14. The electronic communication system of claim 9, the housing configured to couple with the earphone of the earphone in a docked state, the microphone of the earphone being outside of the housing when the earphone is in the docked state.

15. The electronic communication system of claim 14, the microphone of the earphone positioned on a first side of the housing, and the speaker of the earphone positioned on an opposite second side of the housing.

16. An electronic dock for charging an earphone, the electronic dock comprising:
- a dock housing, the dock housing including one or more ports configured to receive the earphone in a docked state,
- a battery at least partially contained within the dock housing and electrically coupled with the earphone, the battery configured to provide power to the earphones,
- a first communication device at least partially contained within the dock housing and in data communication with the earphones;
- a second communication device at least partially contained within the dock housing and configured to provide data communication between the electronic device and a data network;
- a hardware storage device at least partially contained within the dock housing;
- an audio interface component configured to facilitate access to and use of a speaker of the earphones while the earphones are docked in the one or more ports of the dock housing by a user; and
- a processor at least partially contained within the dock housing, the processor configured to:
  - relay audio data between the earphones and the audio interface component in conjunction with the first communication device.

17. The electronic dock of claim 16, the hardware storage device having instructions stored thereon that, when executed by the processor, cause the processor to:
- receive audio information from a microphone,
- recognize at least one audio command from the audio information,
- access an external computing device via the data network, and
- execute at least one task on the external computing device based on the audio command.

18. The electronic dock of claim 17, the external computing device being a cloud-based computing device.

19. The electronic dock of claim 17, the at least one task including conducting a voice call.

20. The electronic dock of claim 17, the at least one task including sending an email.

\* \* \* \* \*